US011001733B2

(12) United States Patent
Kim et al.

(10) Patent No.: US 11,001,733 B2
(45) Date of Patent: May 11, 2021

(54) COMPOSITIONS FOR POLISHING COBALT AND LOW-K MATERIAL SURFACES

(71) Applicant: FUJIMI INCORPORATED, Kiyosu (JP)

(72) Inventors: Hooi-Sung Kim, Tualatin, OR (US); Charles Poutasse, Tualatin, OR (US)

(73) Assignee: FUJIMI INCORPORATED, Kiyosu (JP)

( * ) Notice: Subject to any disclaimer, the term of this patent is extended or adjusted under 35 U.S.C. 154(b) by 0 days.

(21) Appl. No.: 16/369,193

(22) Filed: Mar. 29, 2019

(65) Prior Publication Data

US 2020/0308446 A1 Oct. 1, 2020

(51) Int. Cl.
*C09G 1/02* (2006.01)
*B24B 37/04* (2012.01)
*H01L 21/321* (2006.01)

(52) U.S. Cl.
CPC .............. *C09G 1/02* (2013.01); *B24B 37/044* (2013.01)

(58) Field of Classification Search
None
See application file for complete search history.

(56) References Cited

U.S. PATENT DOCUMENTS 6,375,693 B1 4/2002 Cote et al.
6,475,069 B1 11/2002 Thomas et al.
7,118,686 B2 10/2006 Sinha et al.
8,314,031 B2 11/2012 Hsu
9,524,874 B2 12/2016 Venkataraman et al.
9,545,815 B2 1/2017 Kiceniuk
10,059,860 B2 8/2018 Yasui
10,344,186 B2 7/2019 Hains
2003/0228762 A1* 12/2003 Moeggenborg .......... C09G 1/02 438/691
2004/0014319 A1 1/2004 Sahota et al.
2004/0092102 A1* 5/2004 Li ............................ C09G 1/04 438/689
2004/0244300 A1 12/2004 Ichiki et al.
2008/0171440 A1 7/2008 Kodera
2013/0273379 A1 10/2013 Iwamoto et al.
2014/0243250 A1 8/2014 Miller et al.
2016/0107289 A1* 4/2016 Cavanaugh ............. B24B 37/24 216/53
2016/0108286 A1* 4/2016 Sikma ...................... C09G 1/02 216/53
2017/0158913 A1 6/2017 Reichardt et al.
2019/0031919 A1 1/2019 Takeda et al.
2019/0292405 A1* 9/2019 Kim ......................... C09G 1/02

FOREIGN PATENT DOCUMENTS

JP 2003176479 A * 6/2003 ............... C09K 3/14
WO WO-2007/019342 A2 2/2007
WO WO-2009/056491 A1 5/2009

OTHER PUBLICATIONS

Non-Final Office Action on U.S. Appl. No. 16/539,600 dated Aug. 13, 2020.
Final Office Action on U.S. Appl. No. 16/539,600 dated Dec. 15, 2020.
Advisory Action on U.S. Appl. No. 16/539,600 dated Mar. 10, 2021.

* cited by examiner

*Primary Examiner* — Shamim Ahmed
(74) *Attorney, Agent, or Firm* — Foley & Lardner LLP

(57) ABSTRACT

Provided herein are compositions and methods for polishing surfaces comprising cobalt and optionally a low-K material, e.g., in semiconductor device fabrication. Embodiments include a slurry for chemical mechanical polishing a surface comprising cobalt and low-K materials, such as Black Diamond (BD) or SiN, comprising a complexor, an oxidizer, an abrasive, a Co corrosion inhibitor and an ILD suppressor.

14 Claims, 2 Drawing Sheets

COMPOSITIONS FOR POLISHING COBALT AND LOW-K MATERIAL SURFACES

TECHNICAL FIELD

The present technology generally relates to compositions and methods for polishing surfaces comprising, e.g., cobalt and low-K material.

BACKGROUND

One of the major chemical mechanical polishing (CMP) challenges for semiconductor manufacturing is the selective polishing certain materials. Cobalt (Co) has become widely used in semiconductor device fabrication. Likewise, low-K materials, such as Black Diamond™ (BD, low-k, SiOC:H) or SiN, are commonly used in interlayer dielectric (ILD) of semiconductor devices. It has been challenging to use current CMP compositions in Co polishing applications due to high removal rates of ILDs, such as low-K materials.

The art includes US Pub. No. 2017/0158913, in which a non-ionic surfactant, such as Triton™ DF 16 is used in a cobalt polishing composition. However, this composition does not effectively suppress ILD removal rates.

Accordingly, a need exists for novel CMP compositions that can effectively and efficiently remove Co selectively without an increased removal of ILDs.

SUMMARY OF THE DISCLOSURE

Provided herein are compositions and methods for polishing surfaces comprising cobalt and optionally a low-K material, e.g., in semiconductor device fabrication.

DETAILED DESCRIPTION

Figure 1:
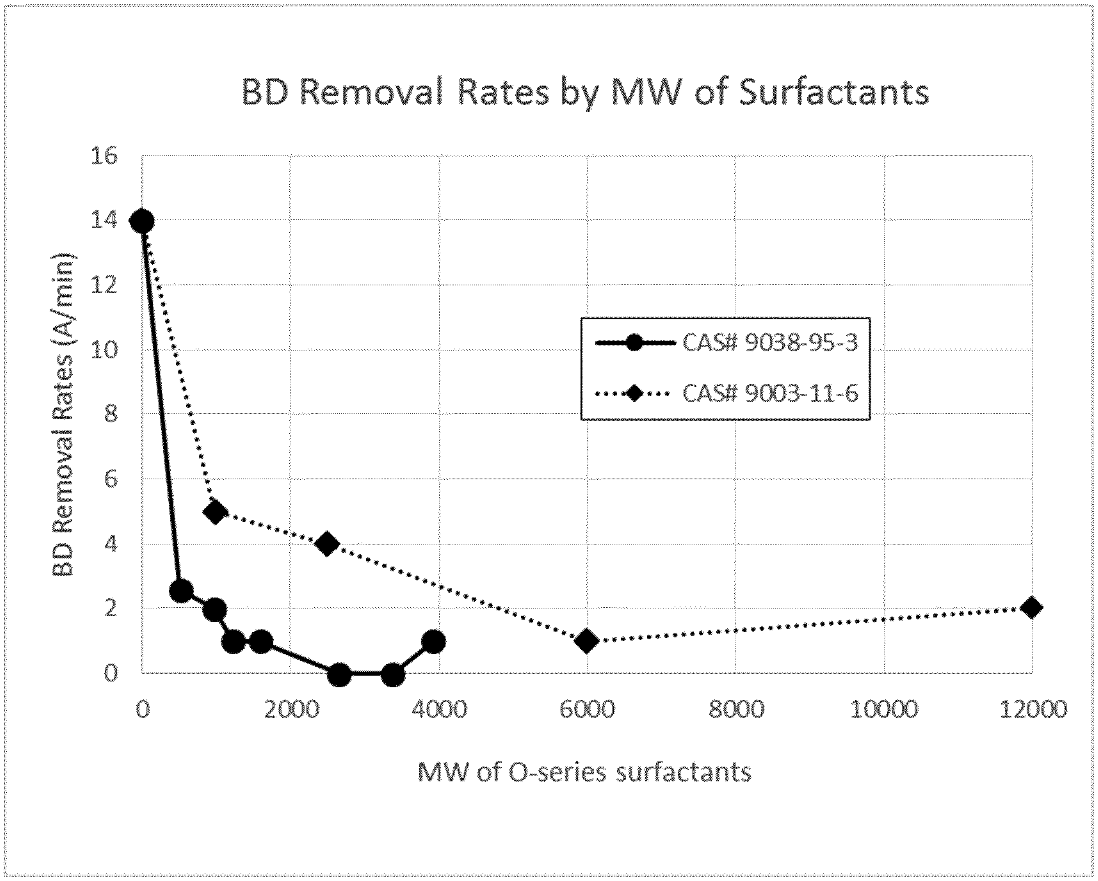
FIG. 1 shows the molecular weight dependency on the BD removal rate suppression. BD RR suppression was achieved when the chemical (CAS #9038-95-3) with MW 500 was added. As the MW of surfactants (CAS #9038-95-3) increased, BD removal rates were suppressed down to 0 Å/min when this chemical with more than MW 2660. A similar trend was observed from the surfactant (CAS #9003-11-6) at MW 980 as described in FIG. 1. With the chemical (CAS #9003-11-6), lowest BD suppression was observed at 1 Å/min from the one with MW 6000 from CAS #9003-11-6.

Provided herein are CMP compositions and methods for polishing surfaces comprising cobalt and optionally a low-K material, e.g., in semiconductor device fabrication. As used herein, the term "chemical mechanical polishing" or "planarization" refers to a process of planarizing (polishing) a surface with the combination of surface chemical reaction and mechanical abrasion. In some embodiments, the chemical reaction is initiated by applying to the surface a composition (interchangeably referred to as a 'polishing slurry,' a 'polishing composition,' a 'slurry composition' or simply a 'slurry') capable of reacting with a surface material, thereby turning the surface material into a product that can be more easily removed by simultaneous mechanical abrasion. In some embodiments, the mechanical abrasion is performed by contacting a polishing pad with the surface, and moving the polishing pad relative to the surface. As used herein, the term "low-K material" is used as it is commonly understood in the art. Low-K material or "low-κ material" is a material with a small relative dielectric constant relative to silicon dioxide. Examples of low-K material include SiN and carbon-doped oxides, such as Black Diamond™ (Applied Materials), Black Diamond™ 2 (Applied Materials), Black Diamond™ 3 (Applied Materials), Aurora™ 2.7 (ASM International N.V.), Aurora™ ULK (ASM International N.V.), etc.

Composition

The CMP polishing compositions disclosed herein can comprise, consist essentially of, or consist of one or more of the following components.

ILD Suppressor

The CMP compositions disclosed herein comprise one or more ILD suppressor of the following formula (I):

$$RO\text{---}(\underset{\displaystyle CH_3}{CH_2\underset{|}{C}HO})_m(CH_2CH_2O)_nH,$$

where m is % propylene oxide (PO) by weight, and is 20% to 60% by weight of the total PO and EO units, n is % ethylene oxide (EO) by weight, and is 40% to 80% by weight of the total PO and EO units, R is a C2-7alkyl, and a weight ratio of EO to PO (EO:PO) is 2:3 to 4:1.

In some embodiments, m is about 20%, 25%, 30%, 35%, 40%, 45%, 50%, 55%, or 60% by weight (or ranges thereinbetween) of the total PO and EO units in the ILD suppressor of formula (I). In some embodiments, n is about 40%, 45%, 50%, 55%, 60%, 65%, 70%, 75%, or 80% by weight (or ranges thereinbetween) of the total PO and EO units in the ILD suppressor of formula (I). In some embodiments, the weight ratio of EO to PO (EO:PO) is 2:3, 1:1, 4:3, 5:3, 2:1, 7:3, 8:3, 3:1, 10:3, 11:3, or 4:1, or ranges therein-between. In some embodiments, R is a C2, C3, C4, C5, C6, or C7alkyl, which may be branched or linear, and may be optionally substituted.

In some embodiments, the ILD suppressor of formula (I) has a molecular weight of about 1000, 1100, 1200, 1300, 1400, 1500, 1600, 1700, 1800, 1900, 2000, 2100, 2200, 2300, 2400, 2500, 2600, 2700, 2800, 2900, 3000, 3500, 4000, 4500, 5000, 5500, 6000, 6500, or 7000 (or ranges thereinbetween). In some embodiments, the ILD suppressor of formula (I) has a molecular weight of greater than about 1000, 1100, 1200, 1300, 1400, 1500, 1600, 1700, 1800, 1900, 2000, 2100, 2200, 2300, 2400, 2500, 2600, 2700, 2800, 2900, 3000, 3500, 4000, 4500, 5000, 5500, 6000, 6500, or 7000.

In some embodiments, the CMP composition has a concentration of the ILD suppressor of formula (I) of greater than 0.002 wt. %., 0.007 wt. %, or 0.07 wt. %. In some embodiments, the CMP composition has a concentration of the ILD suppressor of formula (I) of about 0.002, 0.003, 0.004, 0.005, 0.006, 0.007, 0.008, 0.009, 0.01, 0.015, 0.02, 0.025, 0.03, 0.035, 0.04, 0.05, 0.06, 0.07, 0.08, 0.09, 0.1 wt. % (or ranges thereinbetween).

Complexor

The CMP compositions of the present disclosure also contain at least one complexor. As used herein, the term "complexor" refers to a chemical compound that interacts with surfaces of metals to be polished during the CMP process. In some embodiments, the complexor is selected from the group consisting of an amino acid having only one acidic moiety, an aminocarboxylic acid, and a phosphonic acid. In some embodiments, the complexor is a nitrogen (N-) containing compound. Particularly, in some embodiments, the complexor comprises or consists of at least one amino group. In some embodiments, the complexor is glycine, α-alanine, β-alanine, N-methylglycine, N,N-dimethylglycine, 2-aminobutyric acid, norvaline, valine, leucine, norleucine, isoleucine, phenylalanine, proline, sarcosine, ornithine, lysine, taurine, serine, threonine, homoserine, tyrosine, bicine, tricine, 3,5-diiodotyrosine, β-(3,4-dihydroxyphenyl)-alanine, thyroxine, 4-hydroxyproline, cysteine, methionine, ethionine, lanthionine, cystathionine, cystine, cysteic acid, aspartic acid, glutamic acid, S-(carboxymethyl)-cysteine, 4-aminobutyric acid, asparagine, azaserine, arginine, canavanine, citrulline, δ-hydroxylysine, creatine, histidine, 1-methylhistidine, 3-methylhistidine, and tryptophan. In some embodiments, the complexor is glycine. These complexors may be used singly, or two or more kinds thereof may be used as mixtures.

In some embodiments, the present CMP composition comprises about 0.1% to about 5% by weight of the complexor. In some embodiments, the present CMP composition comprises about 0.1% to about 5% by weight of the complexor. In some embodiments, the present CMP composition comprises about 0.1% by weight of the complexor. In some embodiments, the present CMP composition comprises about 0.2% by weight of the complexor. In some embodiments, the present CMP composition comprises about 0.3% by weight of the complexor. In some embodiments, the present CMP composition comprises about 0.4% by weight of the complexor. In some embodiments, the present CMP composition comprises about 0.5% by weight of the complexor. In some embodiments, the present CMP composition comprises about 0.6% by weight of the complexor. In some embodiments, the present CMP composition comprises about 0.7% by weight of the complexor. In some embodiments, the present CMP composition comprises about 0.8% by weight of the complexor. In some embodiments, the present CMP composition comprises about 0.9% by weight of the complexor. In some embodiments, the present CMP composition comprises about 1% by weight of the complexor. In some embodiments, the present CMP composition comprises about 2% by weight of the complexor. In some embodiments, the present CMP composition comprises about 3% by weight of the complexor. In some embodiments, the present CMP composition comprises about 4% by weight of the complexor. In some embodiments, the present CMP composition comprises about 5% by weight of the complexor.

Abrasive

The CMP compositions of the present disclosure also contain at least one abrasive. The abrasive in the CMP composition provides or enhances mechanical abrasion effects during the CMP process. Examples of abrasives that can be used in connection with the present disclosure include but are not limited to alumina abrasive, silica abrasive, ceria abrasive, titanium oxide, zirconia, or mixtures thereof. The preferred abrasives are alumina and silica. In order to reduce scratch defects, the mean particle size of the abrasive is preferably controlled. In some embodiments, the particle size profile of the abrasive is measured by D90, which is a characteristic number given by a particle sizing instrument to indicate that the sizes of 90% of particles are less than the characteristic number. In some embodiments, the mean particle size is less than 0.3 micron and the D90 of the abrasive is less than 1 micron. Particularly, in some embodiments, the mean particle size is in between 0.01 and 0.30 micron and D90 is less than 0.5 micron.

In some embodiments, the present CMP composition comprises about 0.01% to about 10% by weight of the abrasive. In some embodiments, the present CMP composition comprises less than 10% by weight of the abrasive. In some embodiments, the present CMP composition comprises less than 9% by weight of the abrasive. In some embodiments, the present CMP composition comprises less than 8% by weight of the abrasive. In some embodiments, the present CMP composition comprises less than 7% by weight of the abrasive. In some embodiments, the present CMP composition comprises less than 6% by weight of the abrasive. In some embodiments, the present CMP composition comprises less than 5% by weight of the abrasive. In some embodiments, the present CMP composition comprises less than 4% by weight of the abrasive. In some embodiments, the present CMP composition comprises less than 3% by weight of the abrasive. In some embodiments, the present CMP composition comprises less than 2% by weight of the abrasive. In some embodiments, the present CMP composition comprises less than 1% by weight of the abrasive. In some embodiments, the present CMP composition comprises less than 0.5% by weight of the abrasive. In some embodiments, the present CMP composition comprises less than 0.2% by weight of the abrasive.

Oxidizer

The CMP compositions of the present disclosure may also contain at least one oxidizer. An oxidizer may be added to the present CMP composition to oxidize a metal surface of a polishing object, thereby enhancing the metal removal rate of the CMP process. In some embodiments, an oxidizer is added to the CMP composition only prior to use. In other embodiments, an oxidizer is mixed with other ingredients of the CMP composition at approximately the same time during a manufacturing procedure. In some embodiments, the present composition is manufactured and sold as a stock composition, and an end customer can choose to dilute the stock composition as needed and/or add a suitable amount of an oxidizer before using.

Examples of the oxidizer which may be used include, but are not limited to, a peroxide, hydrogen peroxide, sodium peroxide, barium peroxide, an organic oxidizer, ozone water, a silver (II) salt, an iron (III) salt, permanganese acid, chromic acid, dichromic acid, peroxodisulfuric acid, peroxophosphoric acid, peroxosulfuric acid, peroxoboric acid, performic acid, peracetic acid, perbenzoic acid, perphthalic acid, hypochlorous acid, hypobromous acid, hypoiodous acid, chloric acid, chlorous acid, perchloric acid, bromic acid, iodic acid, periodic acid, persulfuric acid, dichloroisocyanuric acid, and a salt thereof. The oxidizer may be used either singly or as a mixture of two or more kinds. Among them, hydrogen peroxide, ammonium persulfate, periodic acid, hypochlorous acid, and sodium dichloroisocyanurate are preferable.

Suitable content of the oxidizer can be determined based on particular needs. For example, the metal removal rate may be expected to increase as the concentration of the oxidizer increases. In some embodiments, content of the oxidizer in the CMP composition is 0.1 g/L or more. In some embodiments, content of the oxidizer in the CMP composition is 1 g/L or more. In some embodiments, content of the oxidizer in the CMP composition is 3 g/L or more.

In some embodiments, content of the oxidizer in the CMP composition is greater than 0 and 50 g/L or less. In some embodiments, content of the oxidizer in the CMP composition is greater than 0 and 30 g/L or less. In some embodiments, content of the oxidizer in the CMP composition is greater than 0 and 10 g/L or less. As the content of the oxidizer decreases, the cost involved with materials of the CMP composition can be saved and a load involved with treatment of the CMP composition after polishing use, that is, a load involved with waste treatment, can be reduced. It is also possible to reduce the possibility of excessive oxidation of a surface by reducing the content of an oxidizer.

Cobalt Corrosion Inhibitors

The CMP compositions of the present disclosure may also contain at least one cobalt corrosion inhibitor. The cobalt corrosion inhibitor may be any compound that on one hand effectively suppresses Co corrosion under the CMP conditions, and on the other hand also permits a high Co removal rate.

In some embodiments, the present CMP composition comprises one or more cobalt corrosion inhibitors selected from capryleth-4 carboxylic acid capryleth-6 carboxylic acid, laureth-6-carboxylic acid, oleth-9 carboxylic Acid, oleth-6 carboxylic Acid, oleth-10 carboxylic Acid, lauric acid, potassium laurate, benzotriazole, 5-carboxy benzotriazole, 5-benzimidazole carboxylic acid, 5-Methyl benzotriazol, triethanolamine Laurate, potassium oleate, lauryl ether carboxylic acid, ammonium lauryl sulfate, ammonium laurate, potassium myristate, potassium palmitate, polyoxyethylene alkyl ether phosphate, polyoxyethylene tridecyl ether phosphate, and any lauric acid derivatives. In some embodiments, the present CMP composition the cobalt corrosion inhibitor consists of one or more of the above compounds. In some embodiments, the present CMP composition comprises one or more cobalt corrosion inhibitors selected from lauric acid and its derivatives. In preferred embodiments, the cobalt corrosion inhibitor is potassium laurate. Components, such as those in U.S. Pat. No. 10,059,860, may also be included.

In some embodiments, the present CMP composition comprises about 0.0005% to about 1% by weight of the cobalt corrosion inhibitor. In some embodiments, the present CMP composition comprises above about 0.01 wt. % of the cobalt corrosion inhibitor. In some embodiments, the present CMP composition comprises above about 0.02 wt. % of the cobalt corrosion inhibitor. In some embodiments, the present CMP composition comprises above about 0.03 wt. % of the cobalt corrosion inhibitor. In some embodiments, the present CMP composition comprises above about 0.04 wt. % of the cobalt corrosion inhibitor. In some embodiments, the present CMP composition comprises above about 0.05 wt. % of the cobalt corrosion inhibitor. In some embodiments, the present CMP composition comprises above about 0.06 wt. % of the cobalt corrosion inhibitor. In some embodiments, the present CMP composition comprises above about 0.07 wt. % of the cobalt corrosion inhibitor. In some embodiments, the present CMP composition comprises above about 0.08 wt. % of the cobalt corrosion inhibitor. In some embodiments, the present CMP composition comprises above about 0.09 wt. % of the cobalt corrosion inhibitor. In some embodiments, the present CMP composition comprises above about 0.1 wt. % of the cobalt corrosion inhibitor. In some embodiments, the present CMP composition comprises above about 0.15 wt. % of the cobalt corrosion inhibitor. In some embodiments, the present CMP composition comprises above about 0.2 wt. % of the cobalt corrosion inhibitor. In some embodiments, the present CMP composition comprises above about 0.25 wt. % of the cobalt corrosion inhibitor. In some embodiments, the present CMP composition comprises above about 0.3 wt. % of the cobalt corrosion inhibitor. In some embodiments, the present CMP composition comprises above about 0.35 wt. % of the cobalt corrosion inhibitor. In some embodiments, the present CMP composition comprises above about 0.4 wt. % of the cobalt corrosion inhibitor. In some embodiments, the present CMP composition comprises above about 0.45 wt. % of the cobalt corrosion inhibitor. In some embodiments, the present CMP composition comprises above about 0.5 wt. % of the cobalt corrosion inhibitor. In some embodiments, the present CMP composition comprises above about 0.6 wt. % of the cobalt corrosion inhibitor. In some embodiments, the present CMP composition comprises above about 0.7 wt. % of the cobalt corrosion inhibitor. In some embodiments, the present CMP composition comprises above about 0.8 wt. % of the cobalt corrosion inhibitor. In some embodiments, the present CMP composition comprises above about 0.9 wt. % of the cobalt corrosion inhibitor. In some embodiments, the present CMP composition comprises above about 1.0 wt. % of the cobalt corrosion inhibitor.

pH Adjusting Agent

In some embodiments, the present CMP composition further comprises at least one pH adjusting agent. In some embodiments, the pH of the present CMP composition is, although not particularly limited, in the range of about 1 to about 13, inclusive of the end points. In some embodiments, the pH of the present CMP composition is in the range of about 1.5 to about 12.5, inclusive of the end points. In some embodiments, the pH of the present CMP composition is in the range of about 2 to about 12, inclusive of the end points. In some embodiments, the pH of the present CMP composition is in the range of about 2.5 to about 11.5, inclusive of the end points. In some embodiments, the pH of the present CMP composition is in the range of about 3 to about 11, inclusive of the end points. In some embodiments, the pH of the present CMP composition is in the range of about 3.5 to about 10.5, inclusive of the end points. In some embodiments, the pH of the present CMP composition is in the range of about 4 to about 10, inclusive of the end points. In some embodiments, the pH of the present CMP composition is in the range of about 4.5 to about 9.5, inclusive of the end points. In some embodiments, the pH of the present CMP composition is in the range of about 5 to about 9, inclusive of the end points. In some embodiments, the pH of the present CMP composition is in the range of about 6 to about 9, inclusive of the end points. In some embodiments, the pH of the present CMP composition is in the range of about 5.5 to about 8.5, inclusive of the end points. In some embodiments, the pH of the present CMP composition is in the range of about 6 to about 8, inclusive of the end points. In some embodiments, the pH of the present CMP composition is about 7. In some embodiments, the pH of the present CMP composition is about 7.5.

In some embodiments, the pH of the present CMP composition is in the range of about 6 to about 9, inclusive of the end points. In some embodiments, the pH of the present CMP composition is in the range of about 6 to about 10, inclusive of the end points. In some embodiments, the pH of the present CMP composition is in the range of about 6 to about 11, inclusive of the end points. In some embodiments, the pH of the present CMP composition is in the range of about 6 to about 12, inclusive of the end points.

In some embodiments, an acid or an alkali is used as the pH adjusting agent. The acid or alkali used in connection with the present invention can be organic or inorganic compounds. Examples of the acid include inorganic acids such as sulfuric acid, nitric acid, boric acid, carbonic acid, hypophosphorous acid, phosphorous acid, and phosphoric acid; and organic acids such as carboxylic acids including formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, and lactic acid, and organic sulfuric acids including methanesulfonic acid, ethanesulfonic acid, and isethionic acid. Examples of the alkali include hydroxides of an alkali metal, such as potassium hydroxide; ammonium hydroxide, ethylene diamine, and piperazine; and quaternary ammonium salts such as tetramethyl ammonium hydroxide and tetraethyl ammonium hydroxide. These acids or alkalis can be used either singly or in combination of two or more types.

Content of the acid or alkali in the CMP composition is not particularly limited as long as it is an amount allowing the CMP composition to be within the aforementioned pH range.

Other Components

The CMP composition of the present invention may contain, if necessary, other components, such as a preservative, a biocide, a reducing agent, a polymer, a surfactant, or the like.

In some embodiments, for the purpose of enhancing the hydrophilicity of the surface to be polished or increasing the dispersion stability of abrasive, a water soluble polymer may be added to the present CMP composition. Examples of the water soluble polymer include a cellulose derivative such as hydroxymethyl cellulose, hydroxyethyl cellulose (HEC), hydroxypropyl cellulose, hydroxyethylmethyl cellulose, hydroxypropylmethyl cellulose, methyl cellulose, ethyl cellulose, ethylhydroxyethyl cellulose, or carboxymethyl cellulose; an imine derivative such as poly(N-acylalkyleneimine); polyvinyl alcohol; modified (cation modified or non-ion modified) polyvinyl alcohol; polyvinyl pyrrolidone; polyvinylcaprolactam; polyoxyalkylene such as polyoxyethylene; and a copolymer containing those constitutional units. The water soluble polymer may be used either alone or as a mixture of two or more kinds.

In some embodiments, the CMP composition according to the present disclosure may also comprise a biocide or other preservatives. Examples of preservatives and biocides that may be used in connection with the present invention include an isothiazoline-based preservative such as 2-methyl-4-isothiazolin-3-one or 5-chloro-2-methyl-4-isothiazolin-3-one, paraoxybenzoate esters, and phenoxyethanol, and the like. These preservatives and biocides may be used either alone or in mixture of two or more kinds thereof.

Methods and Compositions

In another aspect of the present disclosure, provided herein are methods for chemical mechanical polishing (CMP) of an object having at least one surface. The method comprises contacting the surface with a polishing pad; delivering a CMP composition according to the present disclosure to the surface; and polishing said surface with the CMP composition. In some embodiments, the surface includes cobalt and optionally one or more low-K material.

In another aspect of the present disclosure, provided herein are methods for selectively removing cobalt in the presence of one or more low-K material during a chemical mechanical polishing (CMP) process. The method comprises using for the CMP composition according to the present disclosure.

In another aspect of the present disclosure, provided herein are systems for chemical mechanical polishing (CMP). The system comprises a substrate comprising at least one surface having cobalt and optionally one or more low-K material, a polishing pad, and a CMP composition according to the present disclosure.

In yet another aspect of the present disclosure, provided herein is a substrate comprising at least one surface cobalt and optionally one or more low-K material, wherein the substrate is in contact with a chemical mechanical polishing (CMP) composition according to the present disclosure.

In some embodiments, the present methods and compositions are suitable for polishing a Co surface. An apparatus or conditions commonly used for Co polishing can be adopted and modified according to particular needs. The selections of a suitable apparatus and/or conditions for carrying out the present methods are within the knowledge of a skilled artisan.

In some embodiments, the present methods result in a cobalt removal rate of greater than 500 Å/min, e.g., about 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 Å/min. In some embodiments, the present methods result in a low-K material removal rate of less than 15 Å/min, e.g., less than about 15, 14, 13, 12, 11, 10, 9, 8, 7, 6, 5, 4, 3, 2, 1, 0.1, or 0 Å/min. In some embodiments, the present methods result in a selectivity (cobalt removal rate to low-K material removal rate) of greater than 500, e.g., greater than 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely", "only" and the like in connection with the recitation of claim elements, or use of a "negative" limitation.

The term "about" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term. Certain ranges are presented herein with numerical values being preceded by the term "about". The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

This disclosure is not limited to particular embodiments described, as such may, of course, vary. It is also to be understood that the terminology used herein is for the purpose of describing particular embodiments only, and is not intended to be limiting, since the scope of the present invention will be limited only by the appended claims.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order that is logically possible.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates that may need to be independently confirmed.

The following examples are given for the purpose of illustrating various embodiments of the disclosure and are not meant to limit the present disclosure in any fashion. One skilled in the art will appreciate readily that the present disclosure is well adapted to carry out the objects and obtain the ends and advantages mentioned, as well as those objects, ends and advantages inherent herein. The present examples, along with the methods described herein are presently representative of embodiments and are exemplary, and are not intended as limitations on the scope of the disclosure. Changes therein and other uses which are encompassed within the spirit of the disclosure as defined by the scope of the claims will occur to those skilled in the art.

Examples

TABLE 1

UCON surfactants used in this study

| Name | MW | CAS number | Ethylene oxide | Propylene oxide | EO/PO ratio by weight | Carbon # on alkyl group | # of EO units | # of PO units |
|---|---|---|---|---|---|---|---|---|
| UCON 50-HB-100 | 520 | 9038-95-3 | 50% | 50% | 1 | 4 | 5 | 4 |
| UCON 50-HB-260 | 970 | 9038-95-3 | 50% | 50% | 1 | 4 | 10 | 8 |
| UCON 50-HB-400 | 1230 | 9038-95-3 | 50% | 50% | 1 | 4 | 13 | 10 |
| UCON 50-HB-660 | 1590 | 9038-95-3 | 50% | 50% | 1 | 4 | 17 | 13 |
| UCON 50-HB-2000 | 2660 | 9038-95-3 | 50% | 50% | 1 | 4 | 30 | 22 |
| UCON 50-HB-3520 | 3380 | 9038-95-3 | 50% | 50% | 1 | 4 | 38 | 29 |
| UCON 50-HB-5100 | 3930 | 9038-95-3 | 50% | 50% | 1 | 4 | 44 | 33 |
| UCON 75-H-450 | 980 | 9003-11-6 | 75% | 25% | 3 | 4 | 16 | 4 |
| UCON 75-H-1400 | 2500 | 9003-11-6 | 75% | 25% | 3 | 4 | 42 | 11 |
| UCON 75-H-9500 | 6000 | 9003-11-6 | 75% | 25% | 3 | 4 | 101 | 26 |
| UCON 75-H-90000 | 12000 | 9003-11-6 | 75% | 25% | 3 | 4 | 204 | 51 |

Typical CMP composition formulations are described in Table 2. Slurry A is the base formulation. As described in slurry R, x % of ILD suppressor was added into base formulation A. That formulation became slurry XX.

TABLE 2

Typical formulations at POU formulation (the rest is DIW)

| Slurry name | Slurry A | Slurry R | Slurry Y | Slurry Z |
|---|---|---|---|---|
| Silica content | 0.43% | 0.43% | 0.43% | 0.43% |
| KOH | 0.013% | 0.013% | 0.013% | 0.013% |
| Glycine | 1.13% | 1.13% | 1.13% | 1.13% |
| Potassium laurate | 0.0013% | 0.0013% | 0.0013% | 0.0013% |
| Kordek MLX (Methylisothiazolone) | 0.00038% | 0.43% | 0.43% | 0.43% |
| Ucon 50-HB-2000 | — | 0.074% | 0.00074% | 0.0074% |

Polishing Conditions

Benchtop Polisher [0051]

Polisher: Allied TechPrep Benchtop polisher (1.5-inch×1.5-inch coupon)

Pad: VP6000 pad

Flow rate: 90 mL/min

Platen speed: 250 rpm

Polishing time: 3 min for BD, 30 secs for Co

Down force: 1 psi

Dilution factor: 3.3x $H_2O_2$ (POU): 0.68 wt. %

Westech Polisher [0045]

Polisher: Westech 372M polisher (200 mm wafer)

Pad: VP6000 pad

Flow rate: 200 mL/min

Platen speed: 93/87 rpm

Polishing time: 1 min for BD and SiN, 15 secs for Co

Down force: 1.5 psi

Dilution factor: 3.3x $H_2O_2$ (POU): 0.68 wt. %

Reflexion LK Polisher

Polisher: Reflexion LK (300 mm wafer)

Pad: VP6000 pad

Flow rate: 200 mL/min

Platen speed: 90 rpm

Polishing time: 1 min for BD and SiN, 10 secs for Co

Down force: 1.5 psi

Dilution factor: 3.3x $H_2O_2$ (POU): 0.68 wt. %

Initial screening results with various surfactants described in Table 3. It shows that the formulation containing UCON-50-HB-2000 produced complete BD suppression with high PVD Co removal rate. Specifically, Slurry N contains Triton DF-16 surfactant, which was claimed a good BD suppressor in prior art, US2017/0158913 A1. BD removal rate from this surfactant was 3 Å/min in slurry N. However, the Co removal rate was quite low, compared to the formulation with chemical 9038-95-3 probably due to more hydrophobic tail group from Triton DF-16 containing 8 to 10 carbon atoms.

TABLE 3

Surfactant Screening results; Data collected from Westech polisher. Slurry I (CAS# 9038-95-3) only produced high Co RR and 0 Å/min BD RR.

| Slurry name | CAS # | Surfactant concentration at POU (%) | Co RR (Å/min) | BD RR (Å/min) | Surfactant | Chemical name |
|---|---|---|---|---|---|---|
| Slurry A | 10124-65-9 | — | 7508 | 30 | Potassium laurate | Potassium laurate |
| Slurry B | 68412-59-9 | 0.074% | 0 | 0 | ETHFAC 102 | Mixed lauryl and myristyl phosphate |
| Slurry C | 73038-25-2 | 0.074% | 0 | 0 | ETHFAC 193 | Polyoxyethylene tridecyl ether phosphate |
| Slurry D | 220622-96-8 | 0.074% | 43 | 0 | Akypo RLM25 | Laureth-4 carboxylic acid |
| Slurry F | 57635-48-0 | 0.074% | 67 | 6 | Akypo RO 20VG | Oleth-3 Carboxylic Acid |
| Slurry G | 68081-96-9 | 0.074% | 1829 | 14 | Ammonium lauryl sulfate | Ammonium lauryl sulfate |
| Slurry H | 57-09-0 | 0.074% | 181 | 9 | CTAB (Cetrimonium bromide) | Cetrimonium bromide |
| Slurry I | 9038-95-3 | 0.074% | 7580 | 0 | Ucon 50-HB-2000 | Polyalkylene glycol monobutyl ether |
| Slurry J | 9005-00-9 | 0.074% | 327 | 0 | Brij S100 | Polyoxyethylene (100) Stearyl Ether |
| Slurry K | 9014-93-1 | 0.074% | 367 | 0 | Ethal DNP-18 | Polyoxyethylene dinonyl phenyl ether |
| Slurry L | 9003-11-6 | 0.074% | 71 | 2 | PLONON201 | Oxirane, methyl-, polymerwith oxirane |
| Slurry M | 9003-39-8 | 0.074% | 7986 | 8 | PVP K15 | Polyvinyl pyrrolidine |
| Slurry N | 68603-25-8 | 0.074% | 146 | 3 | Trition DF-16 | Alcohols, C8-C10, ethoxylated propoxylated |

FIG. 1 shows the molecular weight dependency on the BD removal rate suppression. BD RR suppression was achieved when the chemical (CAS #9038-95-3) with MW 500 was added. As the MW of surfactants (CAS #9038-95-3) increased, BD removal rates were suppressed down to 0 Å/min when this chemical with more than MW 2660. A similar trend was observed from the surfactant (CAS #9003-11-6) at MW 980 as described in FIG. 1. With the chemical (CAS #9003-11-6), lowest BD suppression was observed at 1 Å/min from the one with MW 6000 from CAS #9003-11-6.

Figure 2:
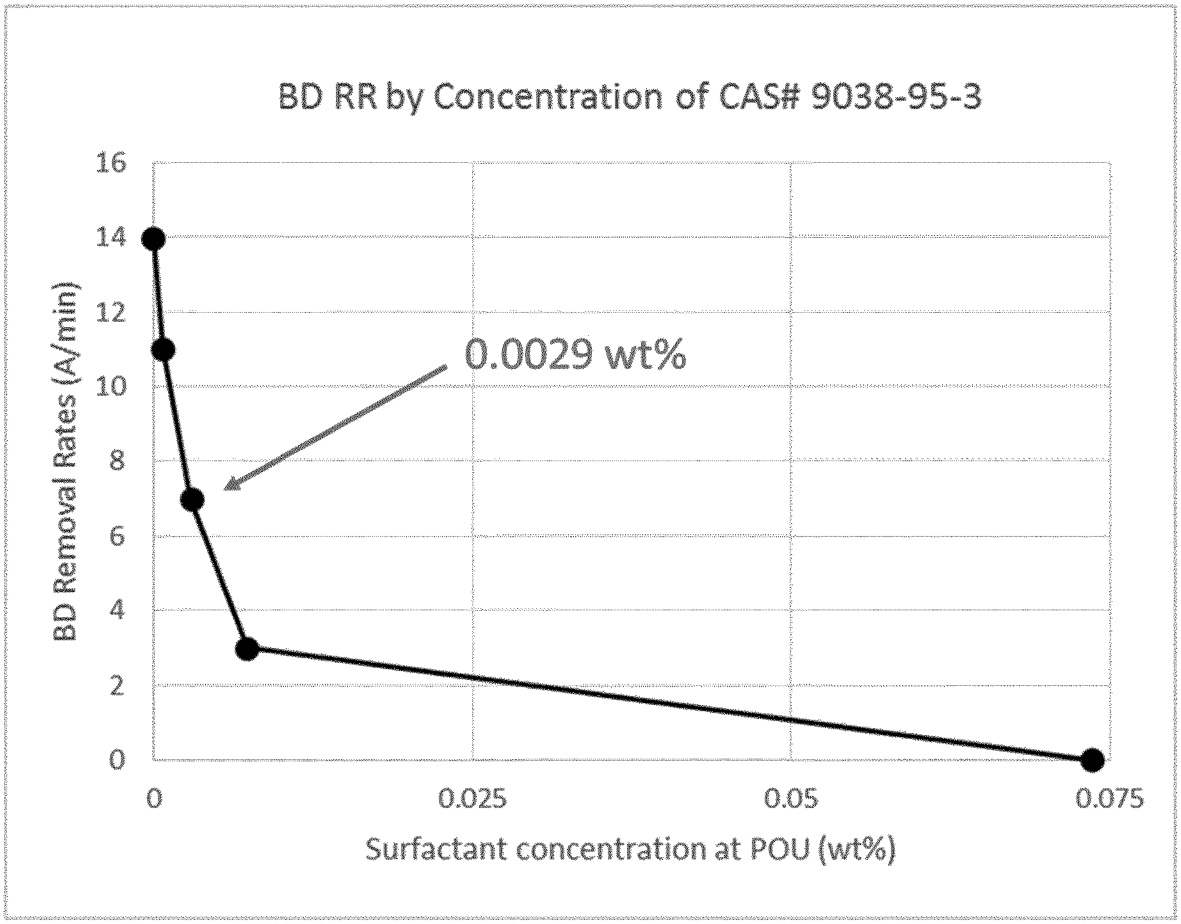
FIG. 2 shows the effect of surfactant concentration up to 0.074 wt. %. BD removal rates reached 0 Å/min when 0.074 wt. % of UCON 50-HB-2000 (CAS #9038-95-3) surfactant was added. Slight BD removal rate suppression was observed with more than 0.0029 wt. % of surfactant.

FIG. 2 shows the effect of surfactant concentration up to 0.074 wt. %. BD removal rates reached 0 Å/min when 0.074 wt. % of UCON 50-HB-2000 (CAS #9038-95-3) surfactant was added. Slight BD removal rate suppression was observed with more than 0.0029 wt. % of surfactant.

These results showed that surfactants with CAS #9038-95-3 or CAS #9003-11-6 produced further BD removal rates suppression as molecular weight increase and BD suppression could be achieved when more than 0.0029 wt. % surfactant was added into slurry formulations. Table 3 summarized the all the slurry used in this study.

From the data in FIG. 1, BD RR suppression is affected by the ratio of EO/PO repeating units. When the molecule around MW 1000 in Table 4, BD RR from Slurry R (MW 2660) was 0 Å/min while that from Slurry V (MW 2500) was 4 Å/min. This result indicates that the ratio between EO/PO (by weight) plays an important role in the suppression of BD RR. Lower the EO/PO ratio, higher the BD suppression. It also shows the range of EO/PO ratio between 1 and 3 is suitable for efficient BD RR suppression to increase selectivity. So far, authors have tested these two chemicals with various MWs. Possibly, chemicals with EO/PO ratio less than 1 may produce good BD suppression as well as high Co/BD selectivity than these chemicals.

Furthermore, slurries with chemicals >MW 3930 from CAS #9038-95-3 and >12000 from CAS #9003-11-6 started producing reduced Co RR, which indicates that too big molecule with high MW are not suitable to be used for high Co RR and stop-on BD application.

TABLE 4

Surfactant concentrations and MW in slurries tested in this IDF. EO/PO ratio by weight shows the difference of two chemicals used in this study. Selectivity data show the MWs effective on BD suppression for each chemical.

| Slurry name | MW | CAS # | EO/PO ratio by weight | Surfactant concentration at POU (%) | Co RR (Å/min) | BD RR (Å/min) | Selectivity (Co/BD) |
|---|---|---|---|---|---|---|---|
| Slurry A | — | — | — | — | 3278 | 14 | 234 |
| Slurry N | 520 | 9038-95-3 | 1 | 0.074% | 2172 | 3 | 835 |

TABLE 4-continued

Surfactant concentrations and MW in slurries tested in this IDF. EO/PO ratio by weight shows the difference of two chemicals used in this study. Selectivity data show the MWs effective on BD suppression for each chemical.

| Slurry name | MW | CAS # | EO/PO ratio by weight | Surfactant concentration at POU (%) | Co RR (Å/min) | BD RR (Å/min) | Selectivity (Co/BD) |
|---|---|---|---|---|---|---|---|
| Slurry O | 970 | 9038-95-3 | 1 | 0.074% | 1973 | 2 | 987 |
| Slurry P | 1230 | 9038-95-3 | 1 | 0.074% | 1884 | 1 | 1884 |
| Slurry Q | 1590 | 9038-95-3 | 1 | 0.074% | 2105 | 1 | 2105 |
| Slurry R | 2660 | 9038-95-3 | 1 | 0.074% | 1864 | 0 | >2000 |
| Slurry S | 3380 | 9038-95-3 | 1 | 0.074% | 2163 | 0 | >2000 |
| Slurry T | 3930 | 9038-95-3 | 1 | 0.074% | 1691 | 1 | 1691 |
| Slurry U | 980 | 9003-11-6 | 3 | 0.074% | 1726 | 5 | 345 |
| Slurry V | 2500 | 9003-11-6 | 3 | 0.074% | 1768 | 4 | 442 |
| Slurry W | 6000 | 9003-11-6 | 3 | 0.074% | 1926 | 1 | 1926 |
| Slurry X | 12000 | 9003-11-6 | 3 | 0.074% | 474 | 2 | 237 |
| Slurry Y | 2660 | 9038-95-3 | 1 | 0.00074% | 3027 | 11 | 275 |
| Slurry Z | 2660 | 9038-95-3 | 1 | 0.00290% | 2100 | 7 | 300 |
| Slurry AA | 2660 | 9038-95-3 | 1 | 0.0074% | 2982 | 3 | 994 |

Table 5 shows the removal rates from 300 mm polisher with slurry Z containing 0.0029% of CAS #9038-95-3. Actually selectivity (1923), was much higher due to high Co RR (3387 Å/min) and low BD RR (2 Å/min) compared to the data obtained from benchtop polisher (Co RR: 2100 Å/min, BD RR: 7 Å/min). It indicates that actual BD RR could be possibly further suppressed when the slurry containing the chemical is used in big polishers. So even slurry Y contains 0.00074 wt. % of the chemical in POU formulation, it could be expected that much lower BD rates could be expected even BD

TABLE 5

Removal rate from 300 mm polisher.

| Slurry name | MW | CAS # | EO/PO ratio by weight | Surfactant concentration at POU (%) | Co RR (Å/min) | BD RR (Å/min) | Selectivity (Co/BD) |
|---|---|---|---|---|---|---|---|
| Slurry A | — | — | | — | 3880 | 12 | 324 |
| Slurry Z | 2660 | 9038-95-3 | 1 | 0.00290% | 3387 | 2 | 1923 |

While certain embodiments have been illustrated and described, it should be understood that changes and modifications can be made therein in accordance with ordinary skill in the art without departing from the technology in its broader aspects as defined in the following claims. Other embodiments are set forth in the following claims.

What is claimed is:

1. A chemical mechanical polishing (CMP) composition for polishing an object having a layer comprising cobalt and low-K material, consisting of:

a complexor selected from the group consisting of glycine, α-alanine, β3-alanine, N-methylglycine, N,N-dimethylglycine, 2-aminobutyric acid, norvaline, valine, leucine, norleucine, isoleucine, phenylalanine, sarcosine, ornithine, lysine, taurine, serine, threonine, homoserine, tyrosine, bicine, tricine, 3,5-diiodotyrosine, β-(3,4-dihydroxyphenyl)-alanine, thyroxine, cysteine, methionine, ethionine, lanthionine, cystathionine, cystine, cysteic acid, aspartic acid, glutamic acid, S-(carboxymethyl)-cysteine, 4-aminobutyric acid, asparagine, azaserine, arginine, canavanine, citrulline, δ-hydroxylysine, and creatine;

an oxidizer selected from the group consisting of hydrogen peroxide, sodium peroxide, barium peroxide, ozone water, a silver (II) salt, an iron (III) salt, permanganese acid, chromic acid, dichromic acid, peroxodisulfuric acid, peroxophosphoric acid, peroxosulfuric acid, peroxoboric acid, performic acid, peracetic acid, perbenzoic acid, perphthalic acid, hypochlorous acid, hypobromous acid, hypoiodous acid, chloric acid, chlorous acid, perchloric acid, bromic acid, iodic acid, periodic acid, persulfuric acid, salts thereof, and combinations thereof;

an abrasive;

a cobalt corrosion inhibitor selected from the group consisting of capryleth-4 carboxylic acid, capryleth-6 carboxylic acid, laureth-6-carboxylic acid, oleth-9 carboxylic acid, oleth-6 carboxylic acid, oleth-10 carboxylic acid, lauric acid, potassium laurate, triethanolamine laurate, potassium oleate, lauryl ether carboxylic acid, ammonium lauryl sulfate, ammonium laurate, potassium myristate, potassium palmitate, polyoxyethylene alkyl ether phosphate, polyoxyethylene tridecyl ether phosphate, and lauric acid derivatives; and an ILD suppressor, wherein the ILD suppressor is a compound of the following formula:

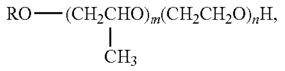

wherein:

m is % propylene oxide (PO) by weight, and is 20% to 60% by weight of the total PO and EO units;

n is % ethylene oxide (EO) by weight, and is 40% to 80% by weight of the total PO and EO units;

R is a $C_{2-7}$alkyl;

a weight ratio of EO to PO (EO:PO) is 2:3 to 4:1; and one or more pH adjusting agents selected from acids consisting of sulfuric acid, nitric acid, boric acid, carbonic acid, hypophosphorous acid, phosphorous acid, and phosphoric acid; and organic acids such as carboxylic acids including formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, and lactic acid, and organic sulfuric acids including methanesulfonic acid, ethanesulfonic acid, and isethionic acid; or from alkali compounds selected from hydroxides of an alkali metal, ammonium hydroxide, ethylene diamine, tetramethyl ammonium hydroxide and tetraethyl ammonium hydroxide;

wherein the pH of the composition is between about 9 and 11.5.

2. The CMP composition according to claim 1, wherein R is a $C_{2-4}$ alkyl.

3. The CMP composition according to claim 1, wherein the molecular weight of the ILD suppressor is greater than 1,000.

4. The CMP composition according to claim 1, wherein the concentration of ILD suppressor in the slurry is between 0.002 wt. % and 0.009 wt. %.

5. The CMP composition according to claim 1, wherein a molecular weight of the ILD suppressor is greater than 1,400.

6. The CMP composition according to claim 1, wherein the weight ratio of EO to PO is 1:1 to 3:1.

7. The CMP composition according to claim 1, wherein m is 25% to 50% and n is 50% to 75%.

8. A method of selectively removing cobalt from a surface in the presence of one or more low-K materials during a chemical mechanical polishing (CMP) process, comprising:

contacting the surface with a polishing pad;

delivering a CMP composition according to claim 1 to the surface; and polishing said surface with the polishing slurry.

9. The method of claim 8, wherein the cobalt removal rate is greater than 1000 Å/min, and the low-K material removal rate is less than 5 Å/min.

10. The method of claim 8, wherein the ratio of the cobalt removal rate to low-K material removal rate is greater than 2000.

11. The CMP composition of claim 1, wherein the concentration of the ILD suppressor is greater than 0.007 wt. %.

12. The CMP composition of claim 1, wherein the weight ratio of EO to PO (EO:PO) is 1:1.

13. The CMP composition of claim 1, wherein the ILD suppressor has a molecular weight of greater than about 2500.

14. A chemical mechanical polishing (CMP) composition for polishing an object having a layer comprising cobalt and low-K material, comprising:

a complexor;

an oxidizer;

an abrasive;

a cobalt corrosion inhibitor; and an ILD suppressor, wherein the ILD suppressor is a compound of the following formula:

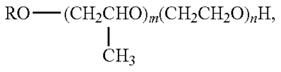

wherein:

m is % propylene oxide (PO) by weight, and is 20% to 60% by weight of the total PO and EO units;

n is % ethylene oxide (EO) by weight, and is 40% to 80% by weight of the total PO and EO units;

R is a $C_{2-7}$alkyl;

a weight ratio of EO to PO (EO:PO) is 2:3 to 4:1; and wherein the pH of the composition is between about 9 and 11.5; and wherein the composition does not comprise a phosphonic acid and a N-heterocyclic compound.

* * * * *